United States Patent
Altshuler et al.

[11] Patent Number: 6,132,844
[45] Date of Patent: *Oct. 17, 2000

[54] SLIP RESISTANT ARTICLES

[75] Inventors: Gordon L. Altshuler, Sunfish Lake; Ramesh C. Kumar, Maplewood, both of Minn.

[73] Assignee: 3M Innovative Properties Company, Saint Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/989,099

[22] Filed: Dec. 11, 1997

[51] Int. Cl.$^7$ .................................................. B32B 5/02
[52] U.S. Cl. ........................ 428/143; 428/149; 428/150; 428/41.8; 428/343; 428/344; 428/355 CN; 428/355 AC; 156/331.6; 156/327; 156/330.9
[58] Field of Search ..................... 428/143, 149, 428/150, 41.8, 343, 344, 355 CN, 355 AC; 156/331.6, 327, 330.9

[56] References Cited

U.S. PATENT DOCUMENTS

| | | | |
|---|---|---|---|
| Re. 24,906 | 12/1960 | Ulrich | 206/59 |
| Re. 25,778 | 5/1965 | Bore et al. | 161/116 |
| Re. 32,249 | 9/1986 | Esmay | 428/40 |
| 2,335,454 | 11/1943 | Schuster et al. | 260/84 |
| 3,299,010 | 1/1967 | Samour | 260/78 |
| 3,356,635 | 12/1967 | Heer et al. | 260/32.8 |
| 3,361,842 | 1/1968 | Applegath et al. | 260/837 |
| 3,397,192 | 8/1968 | Grosser et al. | 260/80.72 |
| 3,417,054 | 12/1968 | Clark et al. | 260/66 |
| 3,491,070 | 1/1970 | Weaver | 260/80.73 |
| 3,578,550 | 5/1971 | Hoerner et al. | 161/162 |
| 3,725,122 | 4/1973 | Limburgerhof | 117/122 |
| 3,728,148 | 4/1973 | Pietsch et al. | 117/93.31 |
| 4,181,752 | 1/1980 | Martens et al. | 427/54.1 |
| 4,243,500 | 1/1981 | Glennon | 156/331 |
| 4,296,017 | 10/1981 | Weissgerber et al. | 260/30.6 |
| 4,303,485 | 12/1981 | Levens | 204/159.24 |
| 4,328,274 | 5/1982 | Tarbutton et al. | 428/149 |
| 4,330,590 | 5/1982 | Vesley | 428/336 |
| 4,340,276 | 7/1982 | Maffitt et al. | 350/164 |
| 4,364,972 | 12/1982 | Moon | 427/54.1 |
| 4,454,179 | 6/1984 | Bennett et al. | 428/41 |
| 4,510,197 | 4/1985 | Shah | 428/220 |
| 4,513,039 | 4/1985 | Esmay | 428/40 |
| 4,522,870 | 6/1985 | Esmay | 428/252 |
| 4,595,737 | 6/1986 | Straub et al. | 526/264 |
| 4,599,265 | 7/1986 | Esmay | 428/355 |
| 4,605,592 | 8/1986 | Paquette et al. | 428/334 |
| 4,726,982 | 2/1988 | Traynor et al. | 428/213 |
| 4,732,635 | 3/1988 | Levens | 156/230 |
| 4,749,617 | 6/1988 | Canty | 428/332 |
| 4,812,541 | 3/1989 | Mallya et al. | 526/264 |
| 4,985,488 | 1/1991 | Landin | 524/555 |
| 4,988,742 | 1/1991 | Moon et al. | 522/79 |
| 5,028,484 | 7/1991 | Martin et al. | 428/352 |
| 5,057,371 | 10/1991 | Canty et al. | 428/411.1 |
| 5,202,361 | 4/1993 | Zimmerman et al. | 522/120 |
| 5,262,232 | 11/1993 | Wilfong et al. | 428/327 |
| 5,349,004 | 9/1994 | Kumar et al. | 524/461 |

FOREIGN PATENT DOCUMENTS

| | | |
|---|---|---|
| 645611 | 7/1962 | Canada . |
| 0 342 811 | 11/1989 | European Pat. Off. . |
| 0 546 746 | 11/1992 | European Pat. Off. . |
| 82/02559 | 8/1982 | WIPO . |
| WO 93/23489 | 11/1993 | WIPO . |
| WO 95/13331 | 5/1995 | WIPO . |

*Primary Examiner*—William P. Watkins, III
*Attorney, Agent, or Firm*—Michaele A. Hakamaki

[57] ABSTRACT

An adhesive backed article, method for its manufacture and a kit including such an article are provided. The article of the invention is provided as an antislip product comprised of a backing and an oil resistant adhesive applied to a major surface of the backing. In one aspect of the invention, an article is provided comprising: a backing having a first and second major surfaces, the first major surface being textured to provide a slip resistant surface; and a pressure sensitive adhesive disposed on the second major surface of the backing, the adhesive formulated to be resistant to peel in use when exposed to oily environments, the adhesive comprising the polymerized reaction product of (a) acrylic acid; (b) at least one N-vinyl containing monomer; (c) at least one acrylate selected from the group consisting of isooctyl acrylate, 2-ethylhexyl acrylate, and combinations thereof; (d) optionally, less than about 20 weight % fluoroalkyl siloxane; and (e) optionally, a cross linking agent.

11 Claims, 1 Drawing Sheet

SLIP RESISTANT ARTICLES

The present invention relates to articles useful in providing slip resistance surfaces, to a method of making such articles and to a kit comprising at least one of such articles.

BACKGROUND OF THE INVENTION

Certain surfaces such as floors in commercial kitchens, for example, can become slippery due to the presence of accumulated oil and greases. Many commercial kitchens include floors comprised of siliceous porous unglazed tile commonly referred to as "quarry tiles." Because of their porous nature, quarry tiles will typically retain residual greases and oils even after rigorous cleaning. These residual greases and/or oils have been known to migrate out of the tile over time.

Commercial products are available for application to any of a variety of flooring surfaces in order to decrease the slippery nature of the floor or to increase the frictional resistance of the surface. Such "slip resistant" articles typically comprise a backing wherein one major surface of the backing is textured by the inclusion of friction particles or the like. The other major surface of the backing is typically coated with a pressure sensitive adhesive for direct application to the flooring. One of the problems with floors exposed to oily conditions such as the aforementioned quarry tiles in commercial kitchens is the incompatibility of the pressure sensitive adhesive to the oily conditions normally experienced in such an environment. The residual greases and oils absorbed within the pores of the tiles often migrate out of the tile and cause adhesive failure within a relatively short period of time. In some cases, solvent based contact cements have been used as a primer on such flooring for application underneath the slip resistant articles. These contact cements, however, have generally been marginal performers and may include undesirable solvents.

Accordingly, there exists a need for a slip resistant article that can be applied to flooring or other surfaces preferably by use of a pressure sensitive adhesive which is resistant to the greases and oils typically found on and within flooring such as the flooring typically found in commercial kitchens or similar environments.

SUMMARY OF THE INVENTION

The present invention provides adhesive backed articles such as antislip products comprised of a backing and an oil resistant adhesive applied to a major surface of the backing. In one aspect of the invention, an article is provided comprising:

a backing having a first and second major surfaces, the first major surface being textured to provide a slip resistant surface; and a pressure sensitive adhesive disposed on the second major surface of the backing, the adhesive formulated to be resistant to peel in use when exposed to oily environments, the adhesive comprising the polymerized reaction product of
  (a) acrylic acid;
  (b) at least one N-vinyl containing monomer;
  (c) at least one acrylate selected from the group consisting of isooctyl acrylate, 2-ethylhexyl acrylate, and combinations thereof; and
  (d) optionally, fluoroalkyl siloxane.

The articles of the invention can have a textured surface provided by embossing or by adhering a multitude of frictional particles at the first major surface of the backing. In general the backing can comprise any of a variety of materials such as cloth, paper, nonwoven webs, polymeric film, fiber, metal sheets, and laminates of the foregoing. A polyester backing is preferred. The N-vinyl monomer is preferably selected from N-vinyl-2-pyrrolidone, N-vinyl caprolactam and combinations thereof.

In another aspect, the invention provides a method for the manufacture of the foregoing articles comprising:

providing a backing having first and second major surfaces, the first major surface being textured to provide a slip resistant surface; and applying the above described pressure sensitive adhesive to the second major surface of the backing; and applying a release liner to the adhesive.

In still another aspect, the invention provides a kit comprising:

at least one of the slip resistant articles described above;

a primer composition;

a package adapted to contain the at least one article and the primer composition.

Those skilled in the art will further appreciate the invention upon consideration of the remainder of the disclosure including the detailed description of the preferred embodiment, the examples and the appended claims.

BRIEF DESCRIPTION OF THE DRAWINGS

In describing the preferred embodiment of the present invention, reference is made to the various figures, wherein.

DETAILED DESCRIPTION OF THE PREFERRED EMBODIMENT

The invention provides slip resistant articles suitable for application to any of a variety of surfaces including floor tiles. The articles of the invention are especially well adapted for use in certain environments normally considered to be hostile to the use of pressure sensitive adhesives. In particular, the articles of the invention are provided with a pressure sensitive adhesive that bonds well with porous surfaces such as to quarry tiles of the type found in commercial kitchens. The adhesive of the invention will adhere to the tiles and remain adhered even when exposed to greases and oils typically present in such environments.

Figure 1:
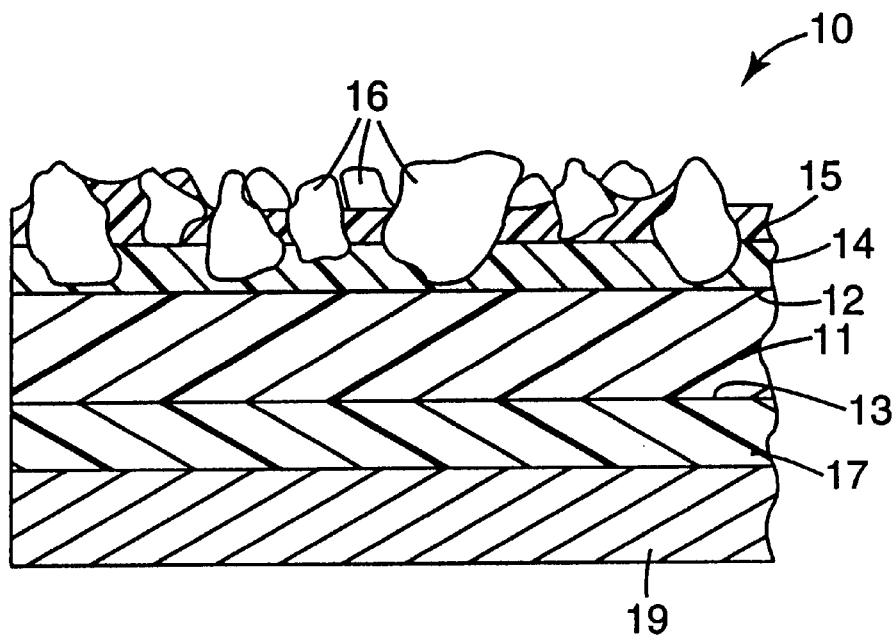
FIG. 1 is an enlarged cross-sectional view of a segment of an antislip sheet material of the present invention, which contains frictional particles.

Referring to FIG. 1, antislip sheet material 10 includes backing sheet 11, having upper surface 12 and lower surface 13. First layer 14 of first binder material (the "make" coating) is bonded to upper surface 12. Second layer 15 of second binder material (the "size" coating) overcoats first layer 14. A multitude of frictional particles 16, capable of withstanding pedestrian traffic without significant fracture, are uniformly distributed over upper surface 12 of backing sheet 11 and firmly bonded thereto by make coating 14 and size coating 15 so that the tops of frictional particles 16 project above the general plane of the exposed surface of size coating 15 to provide a friction or slip resistant surface. It should be noted that the size coating may cover some of the projecting parts of the frictional particles, because the size coating is applied over the frictional particles in making the sheet material. In that case, the top ends of the frictional particles will project above the plane of the top surface of the make coating with a layer of size coating of varying thickness covering the top ends to provide a protuberance consisting of a size coated abrasive particle. In use, the size coating can wear away to expose the projecting top end of the abrasive particle. The combined thickness of the make and size coatings 14 and 15 is sufficient to bond particles 16 thereto and to substantially resist particle loss under pedestrian use.

A layer 17 of pressure sensitive adhesive is coated on lower surface 13 of backing sheet 11 to facilitate attachment of the antislip sheet material to a substrate surface such as a floor, for example. Optionally, if the backing sheet, make coating, size coating, and pressure sensitive adhesive are transparent, either bottom surface 13 or top surface 12 of backing sheet 11 can be imprinted to provide a decorative design, message or other indicia as is disclosed in U.S. Pat. No. 4,328,274 (Tarbutton et al.). Preferably, adhesive layer 17 is protected by an appropriate release liner 19, which can be formed from sheet material known for this purpose, such as silicone coated kraft paper and the like.

The make and size coatings can be formed from the same curable coating composition. Alternatively, the make and size coatings may be from two different coating compositions. One skilled in the art will understand the necessity of assuring effective adhesion of the make coating to the backing sheet and any added minerals or fillers, as well as adhesion of the size coating to the same minerals and the make coating itself. The coating weight of the make and size coatings will vary depending upon the size of the frictional particles, more binder being permitted with larger particles. The make and size coatings should be of a sufficient thickness to bond the particles, but not so thick as to obscure the particles and thereby diminish or eliminate the desired friction surface. Typical coating weights are about 85–200 grams per square meter for the make coating and about 45–145 grams per square meter for the size coating.

The backing sheet is formed from sheet material known for this purpose, such as cloth, paper, nonwoven webs, polymeric film, fiber, metal sheets, as well as laminates or treated versions thereof. Examples include, but are not limited to, cloth or nonwovens of glass, polyester, polyamide, rayon, cotton, or combinations thereof, polymeric films of polyamide, polyvinyl chloride, polyethylene, polypropylene, or combinations thereof, biaxially oriented films of polyethylene terephthalate and polypropylene, annealed aluminum foil, polymethyl methacrylate and ethylene-methacrylic acid copolymers. Typically, the backing sheet need not have an extremely high degree of strength, although such strength is preferred. The backing sheet should have sufficient strength to permit processing, i.e., coating and handling, and installation upon a substrate, and, if desired, removal from such substrate. The surface of the backing sheet can be primed or otherwise treated to improve adhesion to coatings thereon. Many known surface treatments can be used for this purpose. A preferred backing is a polyester backing such as an aziridine-primed polyester film manufactured as described in U.S. Pat. No. 5,057,371 (Canty et al.) using an aziridine treatment solution such as that described in U.S. Pat. No. 4,749,617 (Canty).

Any of a variety of frictional particles can be used in making the antislip and abrasive articles of the present invention. Suitable frictional particles include, but are not limited to, abrasive grain such as silicon carbide, fused aluminum oxide, ceramic aluminum oxide, heat treated aluminum oxide, white aluminum oxide, alumina zirconia, diamond, ceria, cubic boron nitride, garnet, sol-gel derived abrasive grain, and the like, as well as cork, rubber, glass, and polymeric particles made from polyester, urea-formaldehyde, melamine, acrylic, polyalkyl diglycol carbonate, and phenolic resins. The particles can be transparent or opaque. They can be regularly shaped or irregularly shaped, with or without sharp edges (although sharp edges are preferred for abrasive articles). The term "frictional particles" also encompasses single particles that are bonded together to form an agglomerate. The particle size range can vary, depending on the particular use, which is well known to one of skill in the art.

The preferred adhesive for use in the present invention is a pressure sensitive adhesive comprising a crosslinked terpolymer which is the reaction product of an acrylate selected from isooctyl acrylate, ethyl-hexyl acrylate and combinations thereof, an N-vinyl containing monomer such as N-vinyl caprolactam or N-vinyl pyrrolidone; and a free radically polymerizable carboxylic acid such as, preferably, acrylic acid. In a preferred formulation, the acrylate is isooctyl acrylate. The acrylate may initially be present within the adhesive formulation at a concentration, based on the total weight of monomers, between about 80 wt-% and about 90 wt-%. Acrylic acid, or other suitable free radically polymerizable carboxylic acid, is preferably provided at an initial concentration within the range from about 5 wt-% to about 10 wt-%, based on the total weight of monomers. The initial concentration of the N-vinyl monomer (e.g., N-vinyl pyrrolidone) is preferably within the range from about 4 wt-% to about 8 wt-%.

Optionally, a minor amount of fluoroalkyl siloxane may be added to the formulation in order to improve the water and solvent resistance of the adhesive. A particularly suitable fluoroalkyl siloxane is disclosed in U.S. Pat. No. 5,349,004 to Kumar, et al., the disclosure of which is incorporated herein by reference. When used within the adhesive formulation of the present invention, the fluoroalkyl siloxane typically is present within the formulation at an initial concentration less than about 20 wt-% and preferably less than about 10 wt-%. When included within the formulation, the siloxane typically will replace a portion of the acrylate and possibly a minor amount of the other components.

The articles of the invention can be prepared by conventional techniques known to one of skill in the art. For example, a curable coating composition can be applied to a backing sheet by brushing, roll coating, extrusion coating, curtain coating, spraying, knife coating, and the like. Frictional particles can then be applied to this first layer of binder (i.e., the make coating) by a number of known methods such as the methods known in the abrasive making art. One preferred method of coating the frictional particles on the backing sheet is by drop coating wherein the frictional particles are permitted to fall through the air onto the freshly coated surface of the backing sheet so as to be uniformly distributed across the coated surface. Thereafter, the make coating can be cured, or the size coating can be applied immediately and both coatings cured simultaneously.

In preparing the adhesive, the foregoing monomers are mixed in a solvent with a suitable free radical initiator such as 2,2'-azobis (isobutyronitrile) and allowed to react to provide the desired terpolymer. Typically, the monomers, a suitable solvent and initiator are charged in a suitable container such as a wide mouth glass jar of appropriate volume in order to form a mixture. The resulting mixture is purged with nitrogen, typically for 5 minutes at 1 liter per minute. The reaction vessel is then sealed and tumbled in a constant temperature bath at 55 to 65° C. until the % conversion is greater than about 98.5% as determined by gas chromatography, for example. When the desired conversion is achieved, intrinsic viscosity (IV) may be determined in tetrahydrofuran (THF) in the manner described in the Examples below. In general, the intrinsic viscosity correlates with the molecular weight of the polymer. Typically, the IV for the reacted polymer will fall within the range from about 0.33 to about 0.97 deciliters/gram. More preferably, the IV will be within the range from about 0.4 to about 0.5 dl/g. Typically, the molecular weight (number average) for the reacted polymer will be within the range from about 30,000 to about 70,000, preferably from about 35,000 to about 50,000.

A crosslinking agent is preferably added to the polymer/solvent mixture and the mixture is thereafter coated onto a suitable surface such as backing sheet 11 or release liner 19. The crosslinking agent is preferably included within the formulation to provide a degree of crosslinking within the final adhesive to optimize oil resistance, peel strength and adhesive shear strength. Crosslinking agent is typically added to the formulation at a concentration between about 0.1 and 1 wt-% and preferably between 0.1 and 0.5 wt-% based on the weight of the monomers.

Suitable cross linking agents include but are not limited to thermally activated, moisture activated, and ultraviolet radiation (UV) activated crosslinkers. Examples of thermally activated crosslinkers include but are not limited to those selected from the group consisting of multifunctional aziridine amides such as N,N'-bis-1,2-propyleneterephthalamide, metal complexes such as aluminum acetylacetonate, metal ions such as $Zn^{2+}$, $Zr^{2+}$, and $Ni^{2+}$, which can be provided in the form of soluble metal salts. Examples of moisture-activated crosslinkers include but are not limited to those selected from the group consisting of silanes such as trimethoxysilylpropyl methacrylate (tris), aminosilane, epoxy silane, and mixtures thereof. Examples of UV-activated crosslinkers include but are not limited to those selected from the group consisting of triazines as described in U.S. Pat. No. 4,330,590 (Vesley,) and U.S. Pat. No. 4,329,384 (Vesley et al.) and copolymerizable aromatic ketone monomers as described in U.S. Pat. No. 4,737,559 and U.S. Pat. No. 4,847,137 (Kellen et al.), all of which are incorporated herein by reference. A particularly preferred crosslinking agent is the thermally activated agent N,N'-bis-1,2-propyleneterephthalamide.

The adhesive coated backings are allowed to dry, typically at room temperature followed by additional heating at an elevated temperature. A typical drying period is 15 minutes at room temperature followed by approximately 20 minutes at an elevated temperature of about 93° C. to further dry the adhesive layer and, in the presence of a thermally activated cross linking agent, to complete the cross linking reaction. Films are then allowed to cool and the release liner may then be laminated to the adhesive.

As mentioned, the foregoing free-radically polymerizable monomers and a free radical initiator are mixed with a suitable solvent such as methyl ethyl ketone or ethyl acetate. Those skilled in the art will appreciate that the selection of solvent can influence the polymerization reaction by, for example, influencing the reaction rate or the degree of branching in the final polymer. In general, a minimum amount of branching in the adhesive is preferred. Of the two foregoing solvents, ethyl acetate provides less branching than the methyl ethyl ketone. However, either of these solvents are suitable, and those skilled in the art will appreciate that additional solvents may be available. A suitable chain transfer agent for inclusion in the monomer mixture is mercaptoethanol which may be added to the foregoing monomer mixture at a weight percentage between about 0.05 and about 0.2% based on the weight of the monomers. The need for such a chain transfer agent will depend on the selection of solvent and other factors known to those skilled in the art to control the intrinsic viscosity, the molecular weight of the final polymer and the like.

The articles of the present invention can also be used in antislip products without the need for a backing sheet. That is, a composition can be cured to form a free-standing coating, and a layer of adhesive may be applied to one surface of the free-standing cured coating. A free-standing cured coating may be more conformable than those wherein a backing sheet is used. Such a free-standing cured coating can be embossed (either before or after formation of the coating) or include frictional particles mixed therein. To prepare a free-standing cured coating, the curable coating composition is coated on a nonadherent surface, which can be an embossing tool made of polyethylene or untreated polyester, for example, and cured. A layer of adhesive, which can be on a release liner, is then applied to the cured coating. Alternatively, the adhesive can first be cured after coating onto a release liner, for example, and then the free standing coating can be formed by application of an appropriate composition over the adhesive. The release liner, adhesive, and cured coating is then removed from the nonadherent surface as a unitary structure. This free-standing cured coating can then be applied directly to a substrate with the intervening layer of adhesive but no backing sheet.

Figure 2:
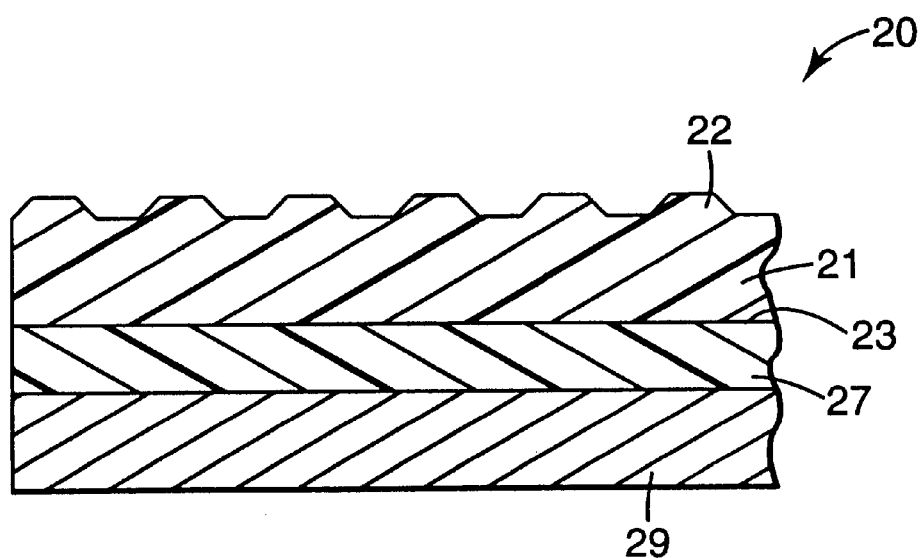
FIG. 2 is an enlarged cross-sectional view of a segment of an alternative antislip sheet material of the present invention, which includes an embossed friction surface.

Referring to FIG. 2, antislip sheet material 20 includes free-standing coating 21, having upper surface 22 and lower surface 23. A layer 27 of pressure sensitive adhesive is coated on lower surface 23 of free-standing coating 21 to facilitate attachment of the antislip sheet material to a substrate surface. Preferably, adhesive layer 27 is protected by appropriate release liner 29, which can be formed from sheet material known for this purpose, such as silicone coated kraft paper and the like.

The articles of the present invention are especially well suited for application to flooring exposed to oily or greasy conditions, such as in commercial kitchens or the like. The adhesive used in the articles of the invention is unexpectedly superior in its resistance to oils and greases, including oils and greases absorbed within the pores of conventional quarry tiles of the type frequently found and used as flooring in commercial kitchens. When compared with other pressure sensitive adhesives, the adhesive formulation described herein for use in the present invention provides a higher peel strength and better shear resistance than other pressure sensitive adhesives disclosed in the art.

In one aspect of the invention, the above-described articles may be provided as part of a kit comprising at least one of the foregoing articles along with a primer composition. The articles and the primer composition are packaged in suitable commercial packaging, for example, which may then be delivered or sold to a consumer or customer for use in providing slip resistance to a commercial floor or the like. Suitable primer compositions for use in the present invention include 3M Concrete Protector & Restorer available from Minnesota Mining and Manufacturing Company of St. Paul, Minn. ("3M"); 3M Cornerstone Floor Sealer, also available from 3M; or, an aqueous fluorochemical composition such as those described in U.S. Pat. No. 5,383,639. Other products will also be suitable for use in the present invention, and those skilled in the art will appreciate that the invention is not limited to the particular selection of primer to be used with the articles described herein.

In applying the articles of the invention to a floor surface such as a floor in a commercial kitchen are, for example, it is generally desirable to first clean the floor with a suitable detergent or degreaser to remove excessive oil and grease from the surface of the floor. The foregoing primer may then be applied in order to provide a relatively clean and grease or oil free surface to which the articles of the invention may then be applied. The articles are applied to the thus prepared floor by removing the backing from the adhesive treated surface and firmly applying the adhesive treated surface of the article to the floor. Suitable pressure should be applied to the article to secure it to the flooring, and it may be desirable to use a hand roller in order to apply an even amount of pressure across the surface of the article as it is applied to the floor.

The articles of the invention find particular applicability in providing slip resistance to flooring surfaces and especially to surfaces that are regularly exposed to oils and/or greases. Thus, the articles of the invention find particular applicability in commercial kitchens such as in restaurant establishments and the like. Even when exposed to greases and oils common to the food industry, the aforementioned pressure sensitive adhesive will provide adequate adhesion, resistance to peel and excellent shear strength for an extended period of time. The articles of the invention will typically provide peel strengths greater than about 30 Newtons per decimeter (N/dm) and preferably greater than 76 N/dm.

The following non-limiting examples further illustrate aspects of the present invention.

EXAMPLES

In the Examples, adhesive compositions were formulated and tested as indicated and explained below. Unless otherwise indicated, all weights are given as parts by weight.

Preparation of Samples

A one liter reaction vessel was charged with the free-radically polymerizable monomers listed in Tables 1 and 2 along with the indicated amount of 2,2'-azobis (isobutyronitrile) as the free radical initiator. The monomers and the initiator were mixed in the indicated solvent (methyl ethyl ketone or ethyl acetate). When ethyl acetate was the solvent, mercaptoethanol was also added to the reactive mixture as a chain transfer agent. The mixture was purged with nitrogen for 5 minutes at a gas flow rate of 1 liter per minute. The vessel was then sealed and tumbled in a constant temperature bath at 55 to 65° C. until the reaction was greater than 98.5% complete, as determined by gas chromatography. Intrinsic Viscosity was determined in tetrahydrofuran (THF) for some of the samples once the desired conversion was achieved, and the results of the IV determination are reported in the Tables in deciliters per gram (dl/g).

A thermally activated cross linking agent (N,N'-bis-1,2-propyleneterephthalamide) was added to the thus prepared polymer which was then applied to a modified polyester film backing prepared as described in U.S. Pat. No. 4,340,276, Example 14. The crosslinking agent was prepared as a 5% solution in toluene, 0.75 gram of which was added to 50 grams of each polymer solution (40% solids). Each adhesive composition was coated onto a separate polyester film to achieve a wet film thickness of about 0.03 cm. The adhesive coated backings were dried initially at room temperature (18–24° C.) for 15 minutes and then for an additional 20 minutes in a drying oven at about 93° C. to complete the cross linking reaction. The dried films were allowed to cool, laminated to release liners, and were then cut into strips (1.3–2.54 cm wide and 15.2 cm long).

Test Procedure A—Peel Strength

Quarry tiles obtained from Century Tile of St. Paul, Minn. were saturated with peanut oil (commercially available from Planters Lifesavers Company of Winston-Salem, N.C. by submerging the individual tiles in peanut oil for at least five (5) days. After the five day treatment, the tiles were each cleaned three times by scrubbing them with a commercial degreaser (available under the trade designation "Twist "N Fill" from Minnesota Mining and Manufacturing Company, St. Paul Minn.). The tiles were wiped dry with a paper towel and the above described adhesive coated strips were applied and firmly adhered to the tiles by the application of hand pressure to the strips using a hand held rubber roller. The strips were allowed to sit at room temperature for 24 hours after their application to the tile. Some of the tiles were then submerged again in peanut oil so that the adhered strips were covered by the oil. The submerged strips and tiles were held at 65° C. for 64 hours. Other adhered strips and tiles (e.g., Example 15) were treated with a light mineral oil (commercially available under the trade designation "Klearol", Witco-Sonneborn) to evaluate the possible effects of hydrocarbon based oils on the adhesive. The mineral oil treatment included an initial immersion of the tiles in mineral oil under the same conditions as stated above for the peanut oil treatment. Following the initial submersion, the tiles were cleaned as described above and adhesive coated strips were applied. The strips and tiles were submerged in mineral oil and held at room temperature in the oil for 100 hours.

After immersion, the tiles were removed from the oil and cooled to room temperature. Excess oil was removed from the tiles by wiping with paper towels. A 90° peel adhesion was then determined for each of the adhered strips.

In determining the 90° peel adhesion for a strip adhered to one of the aforementioned quarry tiles, each tile was mounted on a low friction sled and clamped horizontally in the lower jaw of a tensile testing machine (Chatillon LR5K). One end of the adhered strip was peeled away from the quarry tile and clamped in the upper jaw of the tensile tester. The jaws were then separated at approximately 30.5 cm/minute while measuring the force required to remove the strip at an angle of 90°. Peel strength data for all samples exposed to oil is reported in N/dm under the heading "peel (oil)".

Some sample strips were adhered to clean new quarry tiles, held at room temperature for the above mentioned 64 hour dwell time without exposure to oil, and then tested for peel strength. Peel strength data for all samples tested in the absence of oil is reported in N/dm under the heading "peel (new)".

Test Procedure B—Intrinsic Viscosity

The intrinsic viscosity ("IV") provides a means for the determination of the molecular weight for a particular polymer. IV is reported in deciliters per gram (dl/g). The IV was determined for a number of the adhesive compositions to provide an approximate comparison of the molecular weights of the adhesives used in the Examples. Intrinsic viscosity was measured by conventional means using a Schott Gerate Viscometer (model no. AVS 400) in a water bath controlled at 25° C. to measure the flow time of 1 deciliter of a polymer solution (0.2 grams of polymer per deciliter of tetrahydrofuran solvent) and the flow time of the solvent. The final value for IV was determined according to the equation:

IV=ln(polymer solution time flow/solvent time flow)/Concentration of polymer in polymer solution Examples 1–6 and Comparative Examples A–D Adhesives were formulated using the free radically polymerizable monomers listed in Table 1 at the indicated parts by weight in methyl ethyl ketone (MEK) as the solvent. IV were determined for the indicated adhesive samples. Adhesive backed strips were made, affixed to quarry tiles and then exposed to oil, all according to the above procedures. After exposure to oil, the adhered strips were tested for peel strength. Peel strength data are reported in Table 1.

In general, the adhesives prepared using isooctyl acrylate, acrylic acid, and N-vinyl pyrrolidone provided the best peel strengths. Surprisingly, these adhesive performed well by remaining adhered to the porous quarry tiles even after substantial exposure to oil. The sample of Example 5 was made using 2-ethylhexyl acrylate, showing a lowered but acceptable peel strength. Peel strength data was estimated for the samples of Example 6 and Comparative Example D.

TABLE 1

Peel Strengths; Examples 1–6, and Comparative Examples A–D

| Example | IOA[1] | AA[2] | NVP[3] | MAA[4] | NVC[5] | EHA[6] | AAM[7] | MEK[8] | IV (dl/g) | Peel (oil) N/dm |
|---|---|---|---|---|---|---|---|---|---|---|
| 1 | 45 | 3 | 2 | | | | | 7.5 | | 66.4 |
| 2 | 45 | 3 | 4 | | | | | 82.5 | | 90.3 |
| 3 | 45 | 5 | 2 | | | | | 78 | | 111.9 |
| 4 | 45 | 5 | 4 | | | | | 81 | 0.4 | 174.4 |
| C. Ex. A | 45 | 3 | | | | | | 72 | | 9.2 |
| 5 | 16.7 | 13.3 | | | | 150 | | 270 | 0.57 | 27.0 |
| C. Ex. B | 150 | 0.0 | 13.3 | 16.7 | | | | 270 | 0.59 | 0.4 |
| C. Ex. C | 156.6 | 5.4 | 14.4 | | | | 3.6 | 270 | 0.5 | 0.4 |
| 6 | 200 | 22.2 | 0.0 | | 17.8 | | | 360 | 0.43 | est 100 |
| C. Ex. D | 195.5 | 21.7 | 34.8 | | | | | 378 | 0.4 | est <10 |

[1]isooctyl acrylate.
[2]acrylic acid.
[3]N-vinyl pyrrolidone.
[4]methacrylic acid.
[5]N-vinyl caprolactam
[6]2-ethylhexyl acrylate.
[7]acrylamide.
[8]methyl ethyl ketone Examples 7–15, and Comparative Example E Examples 7–15 and Comparative Example E were prepared and tested for peel strength in the same manner as Examples 1–6 and Comparative Examples A–D. Fluoroalkyl siloxane made according to Example 6 of U.S. Pat. No. 5,349,004 was used in three of the Examples to determine its possible effect on peel strength. Comparative Example E was made with an adhesive including a minor amount of diisononyl phthalate, a known plasticizer, added to the adhesive prior to its application on the strip. Adhesives made in ethyl acetate included 0.024 parts of mercaptoethanol as a chain transfer agent. Example 15 was tested for peel strength after exposure to mineral oil. All of the other samples were tested for peel strength after exposure to peanut oil. Data for the peel strength testing is set forth in Table 2.

Intrinsic viscosity was determined according to the above test method and is also reported. For the adhesives made in MEK as solvent, peel strengths were generally lower than the adhesives made using ethyl acetate, possibly because a higher degree of branching in the polymer backbone for the adhesives made in MEK. Peel force generally increases with increasing intrinsic viscosity for those adhesives in a single series (e.g., made using the same solvent) until IV exceeds about 0.5. IV values greater than 0.5 are generally associated with decreasing peel strengths. For optimum performance of the product (i.e., to balance shear and peel force) the intrinsic viscosity is preferably between 0.4 to 0.5 dl/g.

Minor amounts of the siloxane appear to have some positive effect on adhesion, as shown by the peel strength data. Addition of the plasticizer to the adhesive has a noticeable negative impact on the adhesives ability to remain adhered to the substrate, especially the oil treated substrate. The adhesives formulated using isooctyl acrylate, acrylic acid, and N-vinyl pyrrolidone provided the best peel strengths.

TABLE 2

Peel Strengths; Examples 7–14, and Comparative Example E

| Example | IOA[1] | AA[2] | NVP[3] | FSI[4] | DINP[5] | MEK/EtOAc[6] | IV[7] (dl/g) | peel (new) N/dm | peel (oil) N/dm |
|---|---|---|---|---|---|---|---|---|---|
| 7 | 130.9 | 14.5 | 11.6 | 2.9 | | 240/0 | 0.41 | 170.8 | 38.2 |
| 8 | 132.1 | 14.7 | 11.7 | 1.5 | | 240/0 | 0.41 | 161.7 | 39.4 |
| 9 | 132.7 | 14.7 | 11.8 | 0.74 | | 240/0 | 0.41 | 171.3 | 40.1 |
| C. Ex. E | 133.3 | 14.8 | 11.9 | | 2.9 | 240/0 | 0.42 | 202.5 | 33.6 |
| 10 | 133.3 | 14.8 | 11.9 | | | 240/0 | 0.42 | 201.8 | 39.7 |
| 11 | 20 | 2.2 | 1.8 | | | 0/36 | 0.28 | 277.8 | 81.0 |
| 12 | 20 | 2.2 | 1.8 | | | 0/36 | 0.32 | 246.9 | 84.9 |
| 13 | 20 | 2.2 | 1.8 | | | 0/36 | 0.41 | 235.3 | 77.2 |
| 14 | 20 | 2.2 | 1.8 | | | 0/36 | 0.64 | 169.8 | 57.9 |
| 15 | 20 | 2.2 | 1.8 | | | 0/36 | — | — | 72.9 |

[1]isooctyl acrylate.
[2]acrylic acid.
[3]N-vinyl pyrrolidone.
[4]fluoroalkyl siloxane prepared according to Example 6 of U.S. 5,349,004.
[5]diisononyl phthalate
[6]methyl ethyl ketone/ethyl acetate
[7]Intrinsic Viscosity.

Although the preferred embodiment of the present invention has been described in detail, it will be appreciated that changes and modifications can be made by those skilled in the art without departing from the true spirit and scope of the invention as set forth in the following claims.

What is claimed is:

1. An article useful in providing slip resistant surfaces for application to a substantially planar surface contaminated by oil, the article comprising:

a backing having first and second major surfaces, the first major surface being a textured slip resistant surface; and a pressure sensitive adhesive coated on the second major surface of the backing to resist peel of the article from an oil contaminated surface, the adhesive prepared by polymerizing a composition of monomers consisting essentially of about 80 wt-% to about 90 wt-% of total monomers as isooctyl acrylate; from about 5 wt-% to about 10 wt-% of total monomers as acrylic acid; and from about 4 wt-% to about 8 wt-% of total monomers as an N-vinyl containing monomer, the pressure sensitive adhesive having a peel strength in excess of 35 Newtons per decimeter when in contact with an oil contaminated surface.

2. The article as defined in claim 1 wherein the intrinsic viscosity is from about 0.4 deciliters/gram to about 0.5 deciliters/gram.

3. The article as defined in claim 1 wherein the textured slip resistant surface includes a multitude of frictional particles.

4. The article as defined in claim 3 wherein the frictional particles comprise materials selected from the group consisting of silicon carbide, aluminum oxide, alumina, zirconia, diamond, ceria, cubic boron nitride, garnet, sol-gel derived abrasive grains, cork, rubber, glass, and polymeric particles.

5. The article as defined in claim 1 wherein the backing comprises a material selected from the group consisting of cloth, paper, nonwoven webs, polymeric film, fiber, metal sheets, and laminates of the foregoing.

6. The article as defined in claim 5 wherein the nonwoven web comprises fibers made of materials selected from the group consisting of glass, polyester, polyamide, rayon, cotton, and combinations thereof.

7. The article as defined in claim 5 wherein the polymeric films comprise materials selected from the group consisting of polyamide, polyethylene, polypropylene, and combinations thereof.

8. The article as defined in claim 5 wherein the backing is selected from the group consisting of biaxially oriented films of polyethylene terephthalate and polypropylene, annealed aluminum foil, polymethyl methacrylate and ethylene-methacrylic acid copolymers.

9. The article as defined in claim 1 wherein the N-vinyl monomer is selected from the group consisting of N-vinyl-2-pyrrolidone, N-vinyl-2-caprolactam and combinations thereof.

10. The article as defined in claim 1 including a release liner removably adhered over the adhesive.

11. A method for the manufacture of an article useful in providing slip resistant surfaces for application to a substantially planar surface contaminated by oil, the method comprising the steps of:

providing a backing having first and second major surfaces, the first major surface being a textured slip resistant surface;

applying a pressure sensitive adhesive to the second major surface of the backing, the adhesive prepared by polymerizing a composition of monomers consisting essentially of about 80 wt-% to about 90 wt-% of total monomers as isooctyl acrylate; from about 5 wt-% to about 10 wt-% of total monomers as acrylic acid; and from about 4 wt-% to about 8 wt-% of total monomers as an N-vinyl containing monomer, the pressure sensitive adhesive having a peel strength in excess of 35 Newtons per decimeter when in contact with an oil contaminated surface; and applying a release liner to the adhesive.

* * * * *